United States Patent [19]

Crompton

[11] Patent Number: 5,053,077
[45] Date of Patent: * Oct. 1, 1991

[54] FIRE RESISTANT PAINT OR COATING USING FRITS

[75] Inventor: Geoffrey Crompton, Soutport, United Kingdom

[73] Assignee: Crompton Design Manufacturing Limited, Southport, England

[ * ] Notice: The portion of the term of this patent subsequent to Nov. 7, 2006 has been disclaimed.

[21] Appl. No.: 374,280

[22] Filed: Jun. 30, 1989

[30] Foreign Application Priority Data

Jun. 30, 1988 [GB] United Kingdom ............... 8815593

[51] Int. Cl.$^5$ .................. C09D 5/16; C09D 5/18; C03C 8/22; C03C 8/14
[52] U.S. Cl. .................. 106/18.16; 106/18.18; 501/16; 501/17; 252/601; 252/606; 252/609; 427/419.4; 427/419.6; 428/920; 428/921
[58] Field of Search .................. 252/2, 601, 602, 606, 252/609; 106/14.5, 89, 18.12, 18.15, 18.16, 18.18; 427/385.5, 419.4, 419.6; 501/14, 16, 17; 428/920, 921

[56] References Cited

U.S. PATENT DOCUMENTS

| | | | |
|---|---|---|---|
| 271,995 | 2/1883 | David et al. | 106/15.05 |
| 2,402,864 | 4/1943 | Zurcher et al. | 501/14 |
| 2,977,251 | 3/1951 | Long et al. | 501/14 |
| 3,093,603 | 6/1963 | Gilchrist | 106/15.05 |
| 3,216,847 | 11/1965 | Armant | 501/14 |
| 3,816,367 | 6/1974 | Larkin et al. | 106/15 FP |
| 4,137,178 | 1/1979 | Sherif et al. | 106/15.05 |
| 4,139,515 | 2/1979 | Dennington | 106/15.05 |
| 4,144,074 | 3/1979 | Itoh et al. | 106/15.05 |
| 4,168,175 | 9/1979 | Shutt | 106/15.05 |
| 4,172,110 | 10/1979 | Caesar et al. | 106/15.05 |
| 4,235,836 | 11/1980 | Wassell et al. | 106/15.05 |
| 4,243,579 | 1/1981 | Keogh | 106/15.05 |
| 4,277,355 | 7/1981 | Farcnik | 106/15.05 |
| 4,378,440 | 3/1983 | Bertrand . | |
| 4,495,228 | 1/1985 | Cornwell | 427/385.5 |
| 4,879,066 | 11/1989 | Crompton | 106/18.12 |

FOREIGN PATENT DOCUMENTS

| | | | |
|---|---|---|---|
| 698629 | 11/1964 | Canada | 106/15.05 |
| 0092431 | 10/1983 | European Pat. Off. | 501/14 |
| 0006173 | 3/1978 | Japan | 106/15.05 |
| 0120613 | 9/1979 | Japan | 501/14 |
| 0088140 | 5/1983 | Japan | 501/14 |
| 2072767 | 4/1987 | Japan | 106/15.05 |
| 83/03423 | 10/1983 | PCT Int'l Appl. | 106/15.05 |
| 85/04860 | 11/1985 | PCT Int'l Appl. | 106/15.05 |
| 0206024 | 12/1967 | U.S.S.R. | 501/14 |
| 0733142 | 7/1955 | United Kingdom | 501/14 |
| 1062324 | 4/1967 | United Kingdom | 106/15.05 |

OTHER PUBLICATIONS

*The Glass Industry*, "Classification of Inorganic Enamels", J. Stewart and B. Drakenfeld, pp. 654–660 (Nov. 1965).
*Hawleys Condensed Chemical Dictionary*, 11th Edition, N. Sax et al., 1987, pp. 868–869 (1987).

*Primary Examiner*—William R. Dixon, Jr.
*Assistant Examiner*—Paul Marcantoni
*Attorney, Agent, or Firm*—Leydig, Voit & Mayer

[57] ABSTRACT

A coating composition for providing or enhancing the fire resistance of a material. The composition includes a carrier, a polymer base selected from the group consisting of polyepoxide resins and vinylchloride/acrylic copolymers, an inorganic solid substance that gives off water when the composition is heated under fire conditions and two or more frits of different melting temperatures. The first frit has a relatively low melting point and the other, devitrifying frit has a relatively high melting point compared to the first frit, the frits melting progressively under fire conditions to provide a fused protective layer for the material.

17 Claims, No Drawings

FIRE RESISTANT PAINT OR COATING USING FRITS

This invention concerns compositons that may be used as paints or adhesives.

There is much concern over the use of materials that burn easily and that give off toxic fumes when burning. Hence, much work is being done to find materials and finishes that are resistant to heat and flames that exhibit low smoke characteristics.

An object of this invention is to provide a composition that may be used as a paint or adhesive that exhibits one or more of the above-mentioned desirable properties.

According to this invention there is provided a composition comprising a polymer base, a lower melting frit, a higher melting devitrifying frit, a substance that gives off water on being heated and a carrier, preferably a solvent, such as a xylene based solvent.

A preferred substance that gives off water on being heated is hydrated magnesium calcium carbonate which can give off approximately 53% of its weight in water at 230 degrees C. to inhibit flame spread and to raise degradation temperature. An alternative such substance is alumina trihydrate. A mixture of hydrated magnesium calcium carbonate and alumina trihydrate could be used. The ratio of frits to the substance that gives off water on being heated is preferably from 2:3 to 3:2.

The compositions according to the invention may comprise fillers such as chopped ceramic fibres and/or basalt fibres. A preferred ceramic fibre is polycrystalline mullite fibre ($Al_2O_3/SiO_2$).

The compositions according to the invention may further comprise an intumescent substance, of which vermiculite is an example. The vermiculite is preferably of a small granule size. The fillers may have particle sizes in the range of say 2 to 70 $\mu$ in order to fill gaps between vermiculite particles of larger size. The actual size of the filler particles may be chosen to suit the type of composition. For example, very fine filler particles would probably be used for gloss paints, whereas larger filler particles would probably be used for textured paints or non-slip finish paints.

At least two frits are included in the compositions of the invention, the respective frits having different melt temperatures. One frit could have a melt temperature in the range of 350 degees C. to 450 degrees C. and the devitrifying frit could be one that crystallises between 650 degrees C. and 850 degrees C. remaining hard up to about 1100 degrees C.

Compositions according to the invention may also contain a somke suppressant, such as zinc borate, in an amount of say 3 to 5% by weight.

One main aim of the compositions of the invention is to produce a fused layer which will protect a substrate from the action of flame and heat. The frits are the major contributor to this protective layer. The first frit melts and flows to encapsulate surrounding molecules and triggers off a second frit preferably a devitrifying frits, which hardens, thus holding together char from the substrate and producing a hard protective layer. The substance that gives off water, such as hydrated magnesium calcium carbonate or alumina trihydrate, gives of its water to stop spread of flame at lower temperatures and then combines with the frits. If a coarse coating is ac_ ptable for protection, for example, of aluminium or steel substructures, then the vermiculite additives that may be used in these circumstances, swell to about twenty times their original bulk and combine with the frits and other components to give a desired protective coating.

The frits impart integrity of the char without emitting any smoke or toxic fume. The formulae mentioned are suitable for use with most paint formulations but are aimed at those which are low somke and toxic fume.

According to one preferred embodiment of the invention a paint composition comprises one frit to melt and flow at a lower temperature range and one at a higher temperature range where it crystallises and remains hard to around 1100 degrees C.

According to a preferred embodiment of the invention a decorative coating can be produced using a polyepoxide base resin and an acid acrylic catalyst preferably at an amount of from 5 to 45, especially 20 to 35%, by weight of the polyepoxide especially in a volume ratio of 2:1. The resultant coating can carry the frit (say 20 to 50, preferably 40% by weight) and the substance that gives off water on heating, such as hydrated magnesium calcium carbonate or alumina trihydrate, (say 60%) mix with a bentonite or fatty caly suspension agent, together with color agent, at a ratio of about 30% by weight of the mix to the liquid coating. This coating can be resistance to UV degradation and abrasion resistant, and adhesion tests show that it is suitable for use on most substrates including phenolics. A surface finish from high gloss to matt texture may be achieved dependent on the quantity and particle size of the additves. A clear or tinted lacquer of this coating can be applied as a top coat to give a hard finish.

In yet another preferred embodiment of the invention the same components as mentioned in the polyepoxide formula are incorporated in a PVC paint base. This combination gives a coating with a quick cure time which is suitable for use as, for example, a sealing coat to chipboard and other building boards which suffer from damage by moisture.

The invention will now be further described with reference to the following Examples.

EXAMPLE 1

A decorative coating was produced from a mixture of a polyepoxide base resin at one third the volume of an acid acrylic catalyst. To this mixture was added a mixture of a low melting frit, a devitrifying frit, hydrated magnesium calcium carbonate, a bentonite or fatty clay suspension agent and a color agent. The ratio of the first mixture to the second mixture was 7:3 and the ratio of frits to hydrated magnesium calcium carbonate was 2:3.

The resultant decorative coating proved to be resistant to UV degradation and abrasion. Adhesion tests showed it to be suitable for use on most substrates including phenolic substrates. In addition, the coating had low somke characteristics and was resistant to heat and flames.

EXAMPLE 2

A composition was made by mixing a low melting frit and a devitrifying frit in a ratio of 2:3. The frit mixture was further mixed with hydrated magnesium calcium carbonate in a weight ratio of 1:1. A mixture of polyepoxide base resin, color agent and suspension agent was then prepared and that mixture added to the frits and hydrated magnesium calcium carbonate in a weight ratio of 7:3 in a xylene based solvent.

The resultant mixture when admixed with an acid acrylic catalyst in a ratio of 2:3 to the polyepoxide produced a decorative coating having no flame, no smoke and no fume properties.

EXAMPLE 3

Example 2 was repeated but with an addition of 3% by weight of zinc borate.

EXAMPLES 4 and 5

Examples 2 and 3 were repeated respectively but with a frits weight ratio of low melt to devitrifying of 3:2.

EXAMPLE 6

A vinyl chloride acrylic copolymer water soluble paint was produced by mixing the following ingredients in the amounts given in percent by weight:

| | |
|---|---|
| Water | 11.96 |
| Antifoaming agent (Bevaloid 642) | 0.20 |
| Dispersing aid (Polywet ND) | 0.20 |
| Stabiliser (Synperonic PE/F87 30% w/w water solution | 4.80 |
| Low melting/devitrifying frit mixture ground to 2μ | 20.00 |
| Alumina trihydrate | 10.00 |
| Coalescing solvent (Texunol | 3.00 |
| Thickener (Methocel J12MS) | 0.10 |
| Fungicide | 0.10 |
| Polyvinyl chloride/acrylic copoylmer (Haloflex) | 49.64 |

I claim:

1. A coating composition for providing or enhancing the fire resistance of a mateial comprising a polymer base selected from the group consisting of polyepoxide resins and vinyl chloride/acrylic copolymers, a first frit having a relatively low melting point; and at least one other, devitrifying frit having a relatively high melting point compared to the melting point of said first frit, said frits melting progressively under fire conditions to provide a fused protective layer for said material, a hydrated inorganic solid substance that gives off water when heated under fire conditions and a carrier.

2. A composition as claimed in claim 1, wherein said hydrated inorganic solid substance is selected from the group consisting of hydrated magnesium calcium carbonate and alumina trihydrate.

3. A composition as claimed in claim 1, further comprising a suspension agent.

4. A composition as claimed in claim 3, wherein the suspension agent is bentonite or a fatty clay.

5. A composition as claimed in claim 1 further comprising a color agent.

6. A composition as claimed in claim 1, wherein the carrier is a solvent.

7. A composition as claimed in claim 6, wherein the solvent is xylene based.

8. A composition as claimed in claim 1 further comprising a smoke suppressant.

9. A composition as claimed in claim 8, wherein the smoke suppressant is zinc borate.

10. a composition as claimed in claim 1, wherein the weight ratio of low melting frit to high melting frit is from 3:2 to 2:3 .

11. A composition as claimed in claim 1, wherein the weight ratio of total firts to the substance that gives off water is from 2:3 to 3:2.

12. A composition as claimed in claim 1, wherein the amount of total frits is from 20 to 50% by weight of the total composition less any catalyst for the polymer.

13. A composition as claimed in claim 2 further comprising a catalyst for curing of the polyepoxide base resin.

14. A composition as claimed in claim 13, wherein the catalyst is an acid acrylic catalyst.

15. A composition as claimed in claim 14, wherein the amount of catalyst added is from 5 to 45% by weight of the total composition.

16. A composition as claimed in claim 15, wherein the amount of catalyst added is from 20 to 35% by weight of the total composition.

17. A composition as claimed in claim 1 further comprising thinners.

* * * * *

UNITED STATES PATENT AND TRADEMARK OFFICE
CERTIFICATE OF CORRECTION

PATENT NO. : 5,053,077
DATED : October 1, 1991
INVENTOR(S) : GEOFFREY CROMPTON

It is certified that error appears in the above-identified patent and that said Letters Patent is hereby corrected as shown below:

ON THE TITLE PAGE:

[75] Inventor: Geoffrey Crompton's residence "Soutport" should be -- Southport --.

Col. 1, line 38, "$\mu$in" should be two words -- $\mu$ in --.

Col. 1, line 53, delete "somke" and substitute therefor -- smoke --.

Col. 2, line 5, delete "of" and substitute therefor -- to --.

Col. 3, in Example 6 table, please add ")" after the word -- Texunol --.

Column 3, line 36, delete "mateial" and substitute therefor -- material --.

Column 4, line 21, please capitalize the word "a".

Column 4, line 25, delete "firts" and substitute therefor -- frits --.

Column 4, line 30, delete "2" and substitute therefor -- 1 --.

UNITED STATES PATENT AND TRADEMARK OFFICE
CERTIFICATE OF CORRECTION

PATENT NO. : 5,053,077
DATED : October 1, 1991
INVENTOR(S) : GEOFFREY CROMPTON

It is certified that error appears in the above-indentified patent and that said Letters Patent is hereby corrected as shown below:

Column 4, line 35, delete "14" and substitute therefor --13--.

Signed and Sealed this

Twenty-first Day of June, 1994

Attest:

BRUCE LEHMAN

Attesting Officer

Commissioner of Patents and Trademarks